USO05582495A

United States Patent [19]
Schroeder

[11] Patent Number: 5,582,495
[45] Date of Patent: * Dec. 10, 1996

[54] DUNNAGE FRAME AND LOCK ASSEMBLY

[76] Inventor: Robert C. Schroeder, 7435 Gills Pier Rd., Northport, Mich. 49670

[*] Notice: The term of this patent shall not extend beyond the expiration date of Pat. No. 5,378,093.

[21] Appl. No.: 402,200

[22] Filed: Mar. 10, 1995

[51] Int. Cl.⁶ .............................. B60P 7/15; B61D 45/00
[52] U.S. Cl. .............................. 410/32; 410/144; 410/43; 211/41
[58] Field of Search .................................. 410/32, 34, 43, 410/143–149, 152; 211/41, 94.5; 108/55.1; 206/449, 451

[56] References Cited

U.S. PATENT DOCUMENTS

| | | |
|---|---|---|
| 1,405,757 | 2/1922 | Clark . |
| 2,806,436 | 9/1957 | Johnston . |
| 2,900,925 | 8/1959 | Dunlap . |
| 3,051,099 | 8/1960 | Robertson . |
| 3,078,813 | 2/1963 | Rolfe, Jr. . |
| 3,090,329 | 5/1963 | Rolfe, Jr. . |
| 3,229,994 | 1/1966 | Klein . |
| 3,411,459 | 11/1968 | Hyatt . |
| 3,431,015 | 3/1969 | Breen et al. . |
| 3,486,468 | 12/1969 | Bezlaj et al. . |
| 3,554,136 | 1/1971 | Falk et al. . |
| 3,774,939 | 11/1973 | Freads et al. . |
| 3,799,070 | 3/1974 | Munson . |
| 3,830,537 | 8/1974 | Brindle . |
| 4,074,634 | 2/1978 | Snow et al. . |
| 4,079,677 | 3/1978 | Vandergriff . |
| 4,091,745 | 5/1978 | Patch . |
| 4,256,425 | 3/1981 | Burgess et al. ........................ 410/149 |
| 4,553,888 | 11/1985 | Crissy et al. ............................ 410/144 |
| 4,911,312 | 3/1990 | Jeruzal ................. 410/43 X |
| 4,915,428 | 4/1990 | Hayakawa . |
| 4,919,277 | 4/1990 | Jeruzal . |
| 5,037,256 | 8/1991 | Schroeder ............................... 410/143 |
| 5,326,204 | 7/1994 | Carlson et al. ..................... 410/144 X |
| 5,378,093 | 1/1995 | Schroeder ............................... 410/32 |

FOREIGN PATENT DOCUMENTS

| | | | |
|---|---|---|---|
| 2460409 | 7/1976 | Germany . | |
| 700411 | 12/1979 | U.S.S.R. ................................. 410/34 |

OTHER PUBLICATIONS

Photocopies of photographs that illustrate a previously marketed prior art dunnage bar lock (filed & cited in Schroeder 5,037,256).

Primary Examiner—Karen B. Merritt
Assistant Examiner—Stephen Gordon
Attorney, Agent, or Firm—Barnes, Kisselle, Raisch, Choate, Whittemore & Hulbert

[57] ABSTRACT

A frame assembly for shipment of dunnage that includes a generally rectangular frame having spaced side bars, support rails for vertically supporting dunnage, and a bar and lock arrangement mounted on the frame for locking the dunnage against the support rails. The bar and lock arrangement features a bar having latches at opposed ends of the bar for releasably securing each bar end to an opposed striker mounted on the frame. A pair of swing arms respectively extend from each end of the bar, and are pivotally mounted to an adjacent side bar of the frame so that the swing arms and bar are pivotable as a unit with respect to the frame through an arc between a lowered position remote from the dunnage in the frame upwardly and then downwardly to a second position in which the bar vertically engages the dunnage to lock the dunnage within the frame. Strikers are affixed to the frame for releasably locking the bar in both of the first and second positions. Each latch bolt has a spherical end face that cams over the opposing strikers and helps eliminate alignment problems between the locking bar and the strikers.

9 Claims, 2 Drawing Sheets

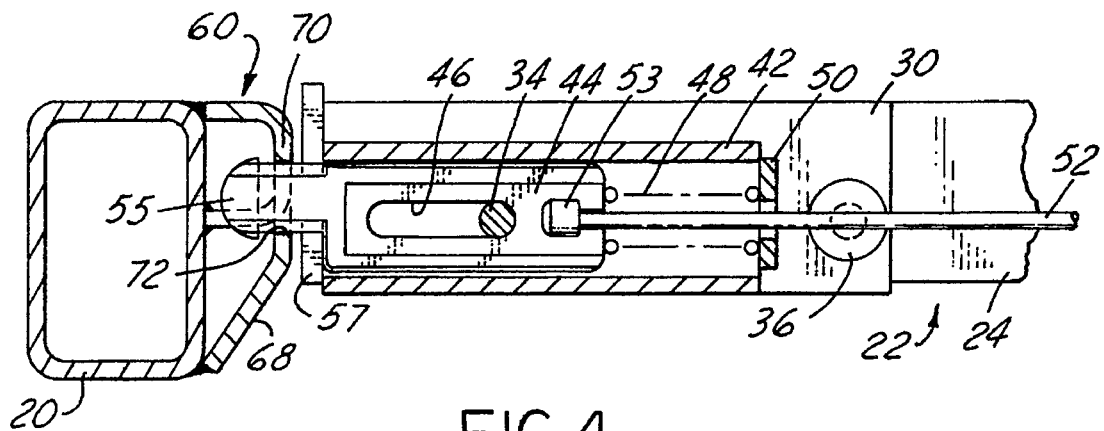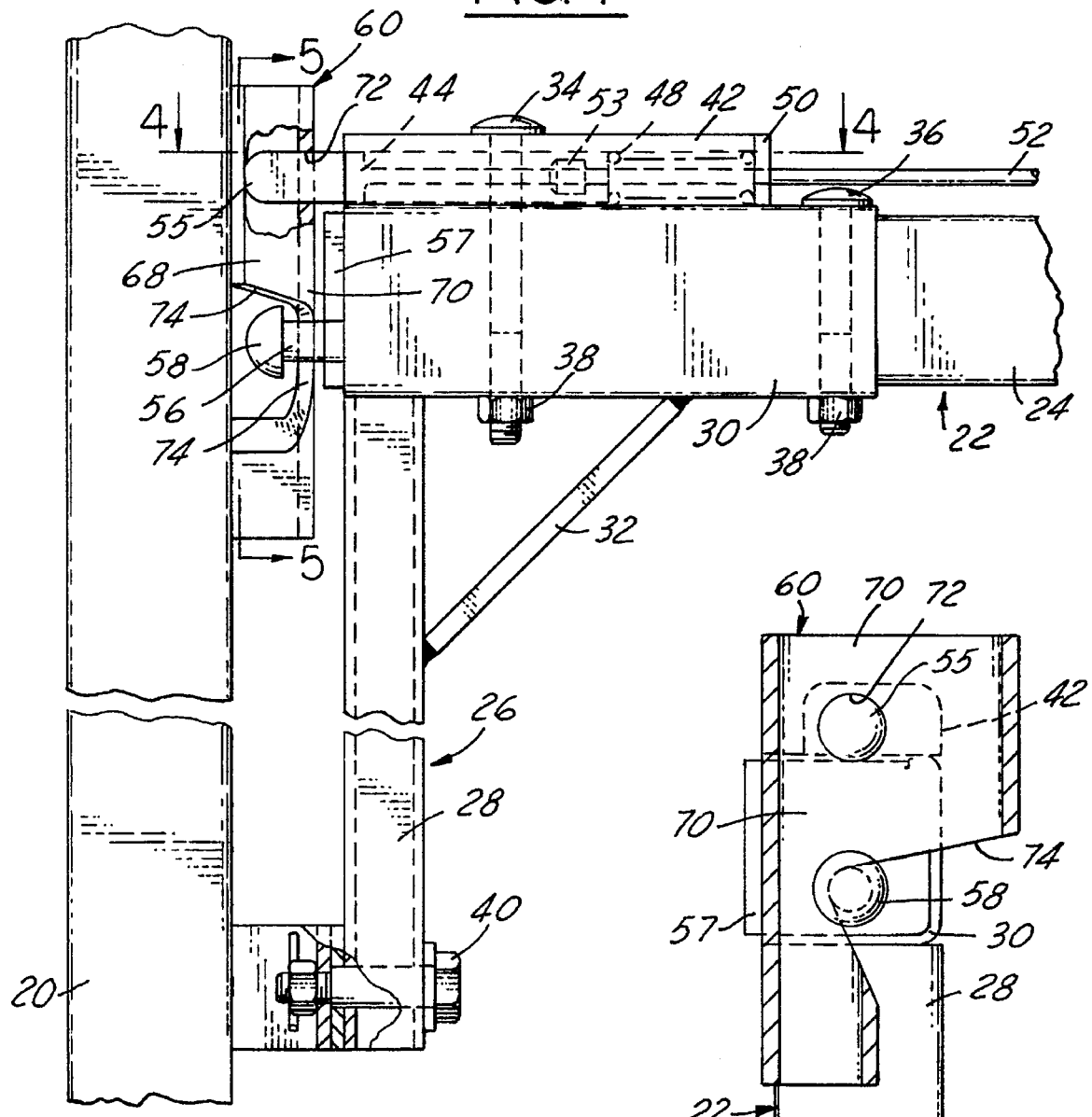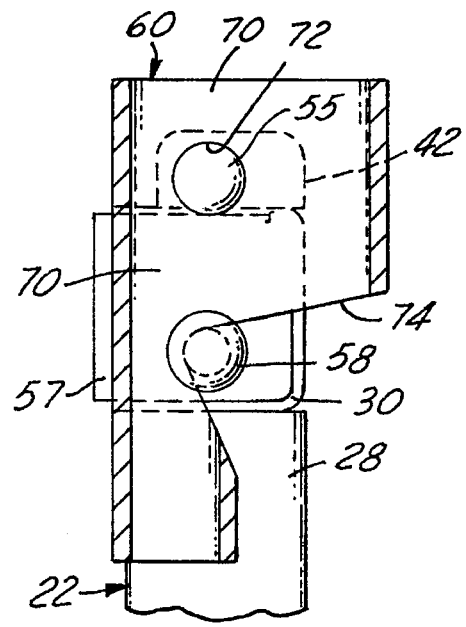

5,582,495

DUNNAGE FRAME AND LOCK ASSEMBLY

The present invention is directed to frame assemblies for shipment and storage of dunnage, and more particularly to a dunnage bar positioning and locking arrangement for use in such frame assemblies.

BACKGROUND AND OBJECTS OF THE INVENTION

A wide variety of lock arrangements have been used for securing bars to a frame in a fixed position to support and retain lading carried by the frame during transport. These bars, commonly known as dunnage bars, are releasably secured at each end in the fixed position by locking devices that typically permit each bar to be completely disengaged from the frame and removed to unload the cargo.

In one such commercially successful dunnage bar locking arrangement heretofore marketed by applicant, the lock includes a saddle having a base and parallel sidewalls spaced from each other by a distance to receive and laterally capture an end of the dunnage bar. A latch is mounted on an end wall of the saddle at a position spaced from the saddle base, and is rotatable on the end wall about an axis parallel to the saddle base between a lower position at which the latch captures the dunnage bar against the saddle base between the sidewalls, and an upper position that permits removal of the dunnage bar end. A coil spring urges the latch against the saddle end wall, and cooperates with a detent integral with an end wall for preventing rotation of the latch from the lower position to the upper position unless the latch is moved against the spring force. A cam surface on the detent automatically moves the latch against the spring force as the latch is manually pivoted from the upper to the lower bar-locking position.

Another such dunnage bar lock arrangement of applicant is that described in U.S. Pat. No. 5,037,256, in which a bar of rectangular cross section has a lateral opening in one side of the bar adjacent to the end of the bar, and a saddle has a base and parallel sidewalls spaced from each other to receive the bar end on the saddle base between the sidewalls. Positioned beneath the saddle base is an L-shaped latch that has a leg which extends upwardly from the saddle base adjacent to the sidewalls, and a finger overlying and spaced from the saddle base by a distance corresponding to the cross sectional dimension of the bar end. The latch is pivotally mounted to the saddle beneath the saddle base, and a coil spring is captured between the saddle and latch bases for urging the latch finger to the position overlying the saddle base. The bar end engages a camming surface on the latch finger for pivoting the latch with respect to the saddle against the force of the spring so that the bar end is received within the saddle, with a locating pin on the saddle base received within the opening at the bar end. In this position, the bar end is locked beneath the latch finger and between the saddle sidewalls.

Applicant's U.S. Pat. No. 5,378,093 discloses a bar lock arrangement that includes a bar of rectangular cross section, a bar lock on each end of the bar for releasably latching the bar to a frame in a position for securing freight, and a swing arm attached to each end of the bar and pivotally mounted to the frame for swinging the bar from the latched position to a remote position for loading or unloading freight while keeping the bar captive to the frame. The bar lock has a spring-biased latch bolt projecting outwardly from the bar for receipt by a striker plate positioned on the frame opposite each end of the bar when the bar is in the latched position. The striker plate has an aperture for receiving the latch bolt to latch the bar. A cable is attached to the latch bolts at both ends of the bar simultaneously to retract the bolts from the apertures to unlatch both ends of the bar. The swing arm is secured on a pivot cantilevered from a mounting bracket affixed to the frame side bars to permit the locking bar to be pivoted about the common axis of the spaced pivots.

Although applicant's prior lock arrangements described above have enjoyed substantial commercial acceptance and success, further improvements remain desirable. For example, in the locking arrangement disclosed in the parent application, the bars are mounted to the frame for horizontally locking the dunnage in position on the frame, while a separate lock arrangement is provided for vertically clamping the dunnage within the frame. Furthermore, in the lowered or unlocked position of the bar in applicant's parent application, the bar is loose, which is to say the bar is not rigidly secured to the frame. If an empty frame is shipped with the locking bar loose in this unlocked position, the lock arrangement can be damaged. It is therefore a general object of the present invention to provide a frame assembly for shipment of dunnage that improves upon applicant's prior lock arrangements in these and other respects. Another object of the present invention is to provide a frame assembly and dunnage bar locking arrangement in which the bar is secured to the frame for vertically holding the dunnage against holding rails in the bottom of the frame, and/or in which the locking bar is releasably secured to the frame both in the dunnage-engaging position of the locking bar, and in the position of the locking bar remote from the dunnage-engaging position for loading and unloading dunnage to and from the frame. A further object of the present invention is to provide a frame assembly and dunnage bar lock arrangement in which the latch bolt is contoured for improving operation thereof in the event of slight misalignment between the locking bar and strikers on the frame.

BRIEF DESCRIPTION OF THE DRAWINGS

The invention, together with additional objects, features and advantages thereof, will be best understood from the following description, the appended claims and the accompanying drawings in which:

FIG. 3 is a fragmentary sectional view taken substantially along the line 3—3 in FIG. 2; and FIGS. 4 and 5 are fragmentary sectional views taken substantially along the respective lines 4—4 and 5—5 in FIG. 3.

DETAILED DESCRIPTION OF PREFERRED EMBODIMENT

The disclosure of above-identified U.S. Pat. No. 5,378,093 is incorporated herein by reference.

Figure 1:
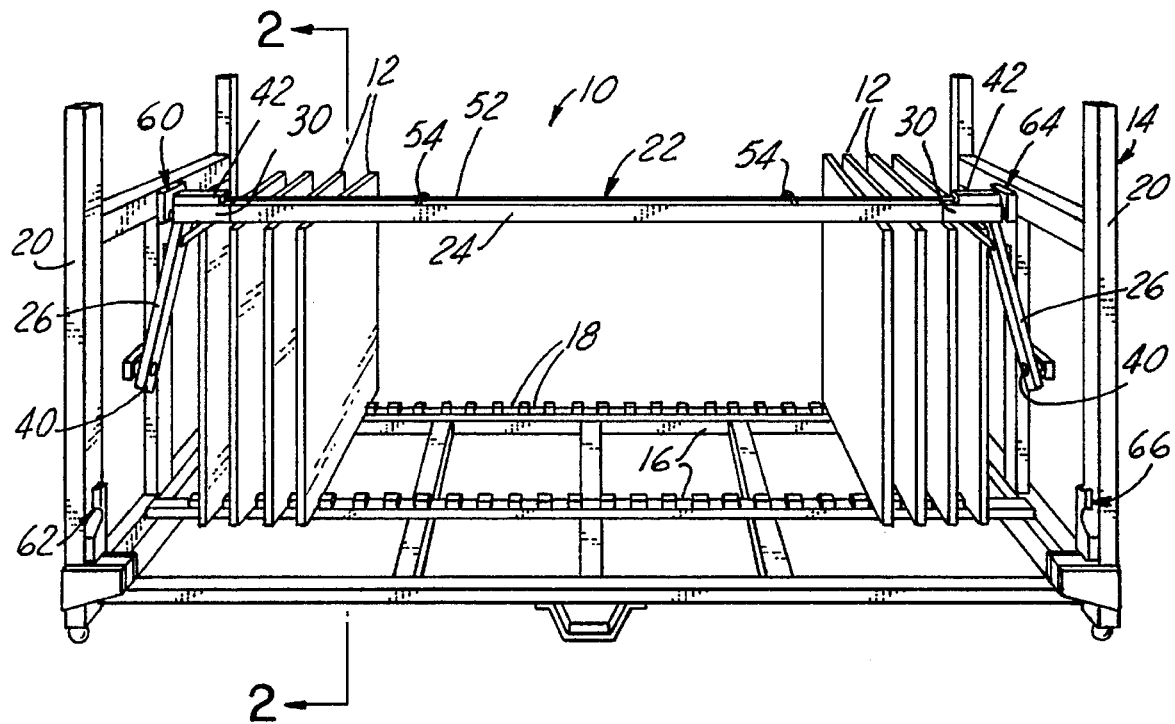
FIG. 1 is an elevational view of a shipping frame for automotive door panels featuring a dunnage bar and bar locks in accordance with a presently preferred embodiment of the invention.

FIG. 1 illustrates a frame assembly 10 in accordance with a presently preferred embodiment of the invention for storage and shipment of automotive door panels 12. A generally rectangular frame 14 has a bed defined by a pair of support rails 16 with individual cushioned slots 18 for receiving and vertically supporting the side edges door panels 12. The center support rail 16 is adjustably positionable between the side bars 20 of frame 14 for supporting panels of varying size and geometry. A dunnage bar and lock arrangement 22 in accordance with the present invention vertically clamps and locks dunnage panels 12 against support rails 16 for storage or shipment of the dunnage panels.

Dunnage bar lock arrangement 22 includes an elongated bar 24 of fixed length and hollow square cross section. A swing arm assembly 26 is affixed to an extends from each end of bar 24 radially or laterally of the longitudinal access of the bar. Each swing arm assembly 26 includes an arm 28 of hollow rectangular tube stock affixed to a hollow C-shaped channel section 30 such that the axes of arm 28 and channel section 30 are orthogonal to each other. An angulated brace 32 extends between arm 28 and section 30. Section 30 is received over the end of bar 24, and is secured thereto by a pair of bolts 34, 36 and associated nuts 38. The free ends of arms 28 are pivotally mounted to opposed side bars 20 by associated shoulder bolts 40 in the manner illustrated in the above-noted U.S. Pat. No. 5,378,093.

A channel is welded or otherwise secured to section 30 adjacent to each end of bar 24 and cooperates with the opposing face of section 30 to form a hollow rectangular guide sleeve 42. A latch bolt 44 is slidably mounted within each sleeve 42. Bolt 34 extends through an elongated slot 46 in each latch bolt 44 for guiding sliding motion of the latch bolt, and for forming a stop to define opposed limits of such sliding motion. A coil spring 48 is captured in compression within each sleeve 42 against an opposing sleeve end 50 for urging each latch bolt 44 axially outwardly from the associated end of bar 24. A cable 52 has buttons 53 at opposed ends received within and affixed to the inner ends of each latch bolt 44. Cable 52 extends through eyes 54 (FIG. 1) between the latch bolts at the opposed ends of bar 24 for manually retracting both latch bolts simultaneously, as disclosed in the above-noted U.S. Pat. No. 5,378,093. The outer end 55 of each latch bolt 44 has a spherical end face or nose, as best seen in FIGS. 3 and 5. A pin 56 extends from an end wall 57 on channel section 30 at each end of bar 24, and has an enlarged hemispherical end 58 spaced from the end wall.

Four striker plates 60, 62, 64, 66 (FIG. 1) are mounted on frame side bars 20 for releasably securing bar 24 in the unlatched position (striker plates 62, 66) for loading or unloading dunnage, and in the dunnage-securing position (striker plates 60, 64) when securing the dunnage in position. Striker plates 60, 66 are identical to each other, and striker plates 62, 64 are identical to each other and mirror images of striker plates 60, 66. Striker plate 60 is illustrated in detail in FIGS. 3—5 as comprising an angulated camming surface 68 that extends from the adjacent edge of side bar 20 to a plateau 70 spaced from the side bar. An aperture 72 in plateau 70 receives rounded nose 55 of latch bolt 44 for locking the dunnage bar in position. The rounded nose 55 of latch bolt 44 helps accommodate misalignment between the pairs of striker plates 60, 64 and 62, 66 at the opposed ends of the bar. A V-shaped slot 74 receives pin 56 and head 58, with head 58 cooperating with the inner surface of striker plate 60 to help rigidify the assembly in the direction axially of bar 24.

In use, with door panels 12 in position as illustrated in FIG. 1, dunnage bar lock arrangement 22 is pivoted upwardly about the aligned axes of shoulder bolts 40, and then downwardly vertically to engage the upper edges of panels 12 so as to clamp and lock panels 12 firmly in position against support rails 16. As bar 22 is so swung into position, rounded noses 55 of the axially opposed latch bolts 44 engage camming surfaces 68 of striker plates 60, 64, camming the latch bolts axially inwardly against the forces of associated coil springs 48. When the rounded ends of the latch bolts align with apertures 72 in striker plates 60, 64, the rounded ends are urged outwardly by associated coil springs 48 firmly to latch the bar in position.

Figure 2:
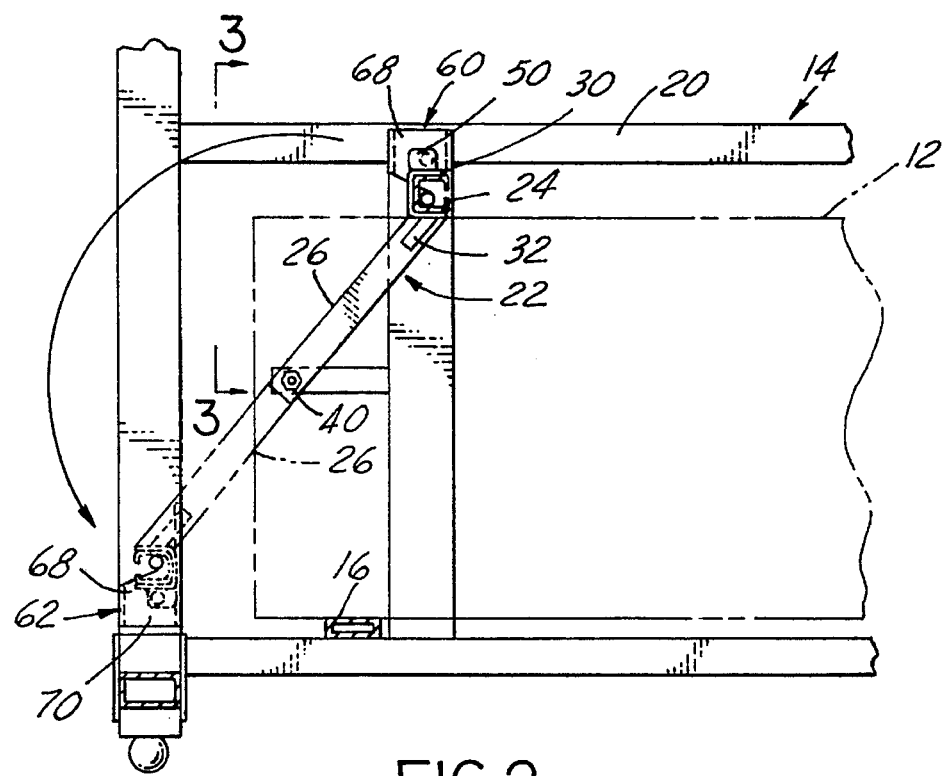
FIG. 2 is a fragmentary side elevational view of a dunnage bar and lock arrangement in the frame of FIG. 1, being taken substantially along the line 2—2 in FIG. 1.

When it is desired to unload panels 12 following shipment and/or storage, cable 52 is manually grasped and pulled, pulling latch bolts 44 axially inwardly against the forces of associated coil springs 48, until latch bolt ends 55 clear associated striker plates 60, 64. Bar assembly 22 is then pivoted upwardly and outwardly from the latching position, and then downwardly toward striker plates 62, 66 at the standby position of the bar illustrated in phantom in FIG. 2. The bar may be released at this point, and swung by gravity downwardly into engagement with striker plates 62, 66, at which point further motion cams the latch bolts axially inwardly against the coil springs until the latch bolts and bar are latched in the downward standby position. At this position, the bar is firmly latched, and panels 12 may be freely unloaded. In the event that frame assembly 10 is shipped with the bar in the standby position, the bar is firmly latched in this position so that inadvertent damage is avoided. The bar may, of course, be readily released from the standby position by grasping and pulling cable 52 so as to release latch bolts 44 as previously described, whereupon the bar may be swung upwardly and outwardly, and then downwardly and inwardly to engage striker plates 60, 64 as previously described.

I claim:

1. A frame assembly for shipment of dunnage that includes:

a frame having spaced side bar means and means between said side bar means for supporting dunnage, and a bar and bar lock arrangement mounted on said frame for locking the dunnage in said supporting means, said bar and bar lock arrangement comprising:

a bar having spaced ends, means at each end of said bar for releasably securing each end of said bar to said frame, a pair of swing arms respectively extending from each end of said bar, each said swing arm having a first end affixed to said bar and a second end spaced from said bar, and means on each said swing arm for pivotally mounting said second end of said swing arm to an associated side bar means of said frame so that said swing arms and said bar are pivotable as a unit with respect to said frame about an axis parallel to said bar and defined by said pivotally mounting means through an arc between a lowered first position remote from dunnage in said supporting means upwardly and then downwardly to a second position in which said bar vertically engages the dunnage to lock the dunnage in said supporting means.

2. The frame assembly set forth in claim 1 wherein said releasably securing means at each end of said bar comprises:

first striker means positioned on said frame opposite each end of said bar adjacent to dunnage in said supporting means, and means on each end of said bar for releasably latching said bar to said first striker means in said second position of said bar in engagement with dunnage in said supporting means.

3. The frame assembly set forth in claim 2 wherein said releasably securing means at each end of said bar further comprises:

second striker means positioned on said frame opposite each end of said bar at said first position of said bar, said releasably latching means also functioning releasably to latch said bar to said second striker means at said first position of said bar for loading and unloading dunnage with respect to said supporting means.

4. The frame assembly set forth in claim 3 wherein said releasably latching means on each end of said bar comprises: a latch bolt projecting from said bar and an aperture in each said striker means for receiving said latch bolt releasably to latch said latch bolt to said striker means in both said first and second positions of said bar to prevent said bar from moving relative to said striker means in a direction generally orthogonal to a longitudinal axis of said bar.

5. The frame assembly set forth in claim 4 wherein said releasably latching means at each end of said bar further comprises:

a guideway on said bar generally parallel with a longitudinal axis of said bar for receiving said latch bolt therein, and means resiliently urging said latch bolt outwardly from said guideway for receipt in said aperture.

6. The frame assembly set forth in claim 5 wherein each said resiliently urging means comprises a coil spring captured in compression within said guideway and in engagement with an end of said latch bolt.

7. The frame assembly set forth in claim 6 wherein each said latch bolt and each said striker means have opposed cam means for urging said latch bolt against said resiliently urging means as said bar is moved to each latched position of said bar.

8. The frame assembly set forth in claim 7 wherein said cam means on each said latch bolt comprises a spherical end face on said latch bolt.

9. The frame assembly set forth in claim 4 further comprising cable means connecting said latch bolts to each other for substantially simultaneous retraction of said latch bolts from the corresponding said striker means in both of the first and second positions of said bar.

* * * * *